US012147153B1

(12) United States Patent
Hossain et al.

(10) Patent No.: US 12,147,153 B1
(45) Date of Patent: Nov. 19, 2024

(54) NANOCELLULOSE X-RAY FILM AND METHOD OF MAKING

(71) Applicant: IMAM MOHAMMAD IBN SAUD ISLAMIC UNIVERSITY, Riyadh (SA)

(72) Inventors: ABM Sharif Hossain, Riyadh (SA); Mohammed Saad Aleissa, Riyadh (SA); Hassan Ahmed Rudayni, Riyadh (SA); Salem Ali S. Alyami, Riyadh (SA); Mohammed Musa Zahrany, Riyadh (SA); Nasir A. Ibrahim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/751,925

(22) Filed: Jun. 24, 2024

Related U.S. Application Data

(63) Continuation of application No. 18/639,365, filed on Apr. 18, 2024, now Pat. No. 12,099,291.

(51) Int. Cl.

| | |
|---|---|
| ***G03C 1/73*** | (2006.01) |
| ***G03C 1/76*** | (2006.01) |
| ***G03C 1/795*** | (2006.01) |

(52) U.S. Cl.
CPC ............... *G03C 1/731* (2013.01); *G03C 1/73* (2013.01); *G03C 1/76* (2013.01); *G03C 1/795* (2013.01)

(58) Field of Classification Search
None
See application file for complete search history.

(56) References Cited

U.S. PATENT DOCUMENTS

| | | | | |
|---|---|---|---|---|
| 5,397,674 A * | 3/1995 | Ozaki | G21K 4/00 | 252/301.36 |
| 10,451,557 B2 * | 10/2019 | Alshatwi | G01N 21/80 | |
| 2010/0163449 A1 * | 7/2010 | Park | C08L 97/02 | 206/524.6 |

FOREIGN PATENT DOCUMENTS

| | | |
|---|---|---|
| CN | 104479368 B | 3/2017 |
| CN | 107400294 A | 11/2017 |
| IN | 202111034046 | 3/2023 |

OTHER PUBLICATIONS

Sikder, A.; Ghann, W.; Jani, M.R.; Islam, M.T.; Ahmed, S.; Rahman, M.M.; Patwary, M.A.M.; Kazi, M.; Islam, J.; Chowdhury, F.I.; et al. Characterization and Comparison of DSSCs Fabricated with Black Natural Dyes Extracted from Jamun, Black Plum, and Blackberry. Energies 2023, 16, 7187. (Year: 2023) (Year: 2023).*

(Continued)

*Primary Examiner* — Sean M DeGuire
*Assistant Examiner* — Andrew Preston Traywick
(74) *Attorney, Agent, or Firm* — Oblon, McClelland, Maier & Neustadt, L.L.P.

(57) ABSTRACT

An X-ray-sensitive film includes an acid-hydrolyzed palm mesocarp, a starch, a cellulose, a synthetic polymer, a plant hydrogel, a cyanoacrylate adhesive, glycerin, and an x-ray-sensitive dye. A method of preparing the X-ray-sensitive film includes 32.5 to 45 wt % cellulose based on a total weight of the X-ray-sensitive film, a tensile modulus of 0.75 to 2.5 GPa, a tensile strength of 75 to 125 MPa/kg·m$^3$, a water absorption of 0.00 to 0.16% measured according to ASTM D570, a carbonate content of 100 to 200 ppm, and shows no cracks when tested according to ASTM D5419.

20 Claims, 12 Drawing Sheets

(56) References Cited

OTHER PUBLICATIONS

Aswathy Jayakumar et al., Starch-PVA composite films with zinc-oxide nanoparticles and phytochemicals as intelligent pH sensing wraps for food packaging application, International Journal of Biological Macromolecules, vol. 136, 2019, pp. 395-403 (Year: 2019) (Year: 2019).*

Braga et al. ; Cellulose nanostructured films from pretreated açai mesocarp fibers: physical, barrier, and tensile performance ; CERNE, vol. 27 ; 2021 ; 14 Pages.

Kaewprachu et al. ; Carboxymethyl cellulose from Young Palmyra palm fruit husk: Synthesis, characterization, and film properties ; Food Hydrocolloids, vol. 124, Part A ; Mar. 2022 ; 3 Pages.

Campos et al. ; Bionanocomposites produced from cassava starch and oil palm mesocarp cellulose nanowhiskers ; Carbohydrate Polymers 175 ; Aug. 3, 2017 ; 7 Pages.

4. Aswathy Jayakumar et al., Starch-PVA composite films with zinc-oxide nanoparticles and phytochemicals as intelligent pH sensing wraps for food packaging application, International Journal of Biological Macromolecules, vol. 136, 2019, pp. 395-403 (Year: 2019).

Sikder, A; Ghann, W.; Jani, M.R.; Islam, M.T.; Ahmed, S.; Rahman, M.M.; Patwary, MAM.; Kazi, M.; Islam, J.; Chowdhury, F.I.; et al. Characterization and Comparison of DSSCs Fabricated with Black Natural Dyes Extracted from Jamun, Black Plum, and Blackberry. Energies 2023, 16, 7187. (Year: 2023).

* cited by examiner

NANOCELLULOSE X-RAY FILM AND METHOD OF MAKING

CROSS-REFERENCE TO RELATED APPLICATIONS

The present application is a Continuation of U.S. application Ser. No. 18/639,365, now allowed, having a filing date of Apr. 18, 2024.

BACKGROUND

Technical Field

The present disclosure is directed to an X-ray-sensitive film, and particularly to an X-ray-sensitive film prepared from biological materials, and a method of preparation thereof.

Description of Related Art

The "background" description provided herein presents the context of the disclosure generally. The work of the presently named inventors, to the extent it is described in this background section, as well as aspects of the description that may not otherwise qualify as prior art at the time of filing, are neither expressly nor impliedly admitted as prior art against the present invention.

X-ray films/radiographs are used by medical professionals for the diagnosis and/or treatment of patients in the majority of cases. Even with the advent of digital imaging there are a large number of medical establishments such as dental offices that use conventional film-based methods to obtain the radiographic images. Unfortunately, conventional radiographic procedures require the use of films made from petroleum-based materials. These films therefore have significant environmental impact, which in turn may pose a risk to human health. For use as an X-ray-sensitive film, a film must be stable (does not degrade due to heat/moisture) over time and demonstrate good mechanical properties. Ideally, a film has a long shelf life without degradation and is not easily torn or damaged.

Accordingly, an object of the present disclosure is to provide an eco-friendly X-ray-sensitive film that overcomes these limitations.

SUMMARY

In an exemplary embodiment, a method of producing an X-ray-sensitive film is described. The method includes blending palm mesocarp and water to form a raw plant mixture, heating the raw plant mixture to form a cooked plant mixture, acid treating the cooked plant mixture with an aqueous acid at 30 to 60° C. to form a treated plant mixture, mixing the treated plant mixture with a starch, a cellulose, a synthetic polymer, a plant hydrogel, a cyanoacrylate adhesive, glycerin, and an X-ray-sensitive dye to form an uncured mixture, heating the uncured mixture to 125 to 175° C. to form a cured mixture, and drying the cured mixture at 60 to 100° C. to form the X-ray-sensitive film.

In some embodiments, the method further includes adjusting a pH of the uncured mixture to a pH of 7.0 to 11.0.

In some embodiments, the X-ray-sensitive dye is a Jamun dye. In some embodiments, the Jamun dye is obtained by blending Syzgium cumini and water to form a raw dye mixture, and further heating the raw dye mixture to 50 to 100° C. to produce the Jamun dye.

In some embodiments, the palm mesocarp is unripe palm mesocarp, the aqueous acid is 80% sulfuric acid, the synthetic polymer is polyvinyl chloride, and the plant hydrogel comprises aloe vera gel, okra gel, and Acacia *arabica* gel. In some embodiments, the X-ray-sensitive film comprises nanocellulose having a mean particle size of 10 to 35 nm. In some embodiments, the starch is present in an amount of 10 to 20 wt. %, the synthetic polymer is present in an amount of 2.5 to 7.5 wt. %, the plant hydrogel is present in an amount of 10 to 20 wt. %, the cyanoacrylate adhesive is present in an amount of 2.5 to 7.5 wt. %, the glycerin is present in an amount of 2.5 to 7.5 wt. %, and the treated plant mixture is present in an amount of 17.5 to 62.5 wt. %, each based on a total weight of X-ray-sensitive film. In some embodiments, the X-ray-sensitive film includes 32.5 to 45 wt. % cellulose based on the total weight of the X-ray-sensitive film. In some embodiments, the X-ray-sensitive film has a tensile modulus of 0.75 to 2.5 GPa, and a tensile strength of 75 to 125 MPa/kg·m$^3$.

In some embodiments, the raw plant mixture is heated to 125 to 175° C. at 15 to 45 pounds per square inch (PSI) gauge.

In some embodiments, the raw plant mixture is devoid of an added base.

In an exemplary embodiment, an X-ray-sensitive film is described. In some embodiments, the X-ray-sensitive film includes an acid-hydrolyzed palm mesocarp, a starch, a cellulose, a synthetic polymer, a plant hydrogel, a cyanoacrylate adhesive, glycerin, and an X-ray-sensitive dye. In some embodiments, the synthetic polymer is polyvinyl chloride, the plant hydrogel comprises aloe vera gel, okra gel, and acacia *arabica* gel, and the X-ray-sensitive dye is a Jamun dye derived from Syzgium cumini.

In some embodiments, the X-ray-sensitive film includes the starch present in an amount of 10 to 20 wt. %; the synthetic polymer present in an amount of 2.5 to 7.5 wt. %; the plant hydrogel present in an amount of 10 to 20 wt. %; the cyanoacrylate adhesive is present in an amount of 2.5 to 7.5 wt. %; and the glycerin present in an amount of 2.5 to 7.5 wt. %, each based on a total weight of X-ray-sensitive film. In some embodiments, the X-ray-sensitive film comprises 32.5 to 45 wt. % cellulose based on a total weight of the X-ray-sensitive film.

In some embodiments, the X-ray-sensitive film comprises nanocellulose having a mean particle size of 10 to 35 nm.

In some embodiments, the X-ray-sensitive film has a tensile modulus of 0.75 to 2.5 GPa, and a tensile strength of 75 to 125 MPa/kg·m$^3$.

In some embodiments, the X-ray-sensitive film has a water absorption of 0.00 to 0.16% measured according to ASTM D570, a carbonate content of 100 to 200 ppm, and shows no cracks when tested according to ASTM D5419.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
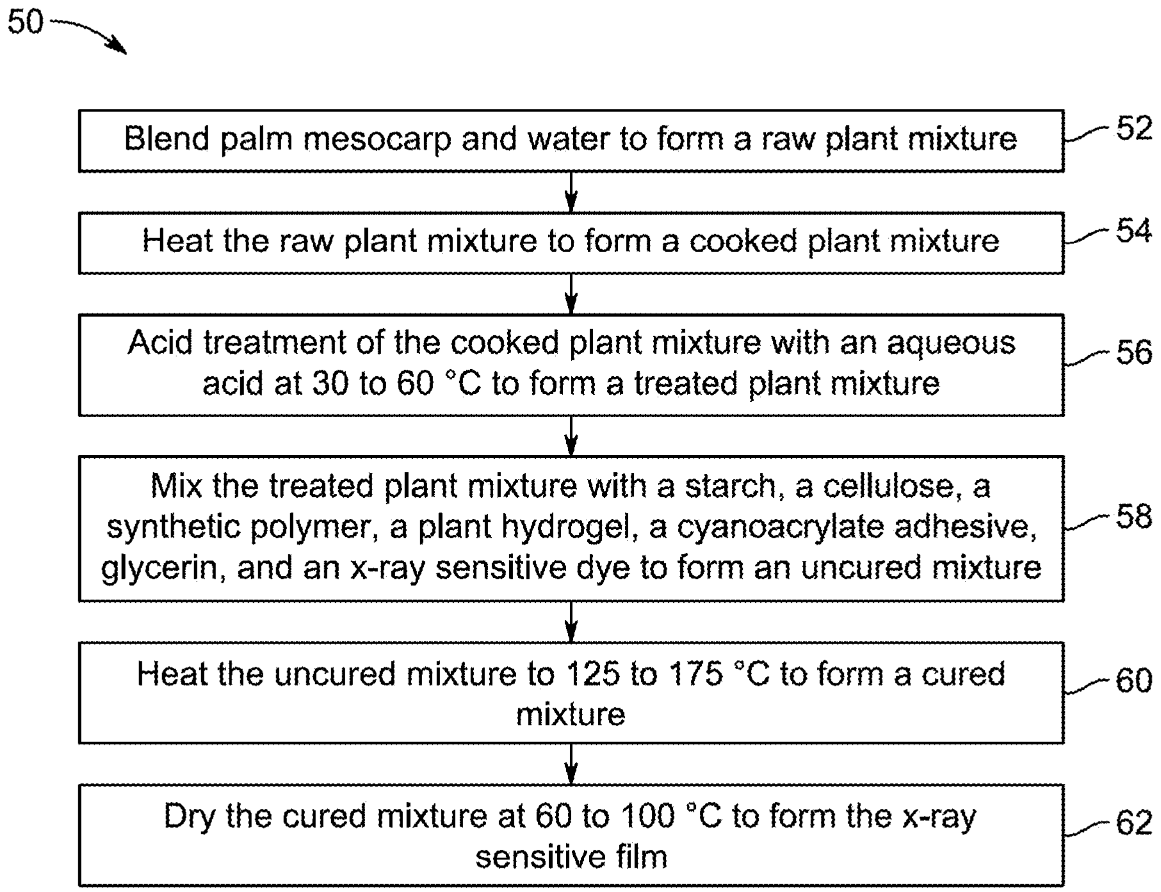
FIG. 1A is a flowchart describing a method of producing an X-ray-sensitive film, according to certain embodiments.
Figure 1B:
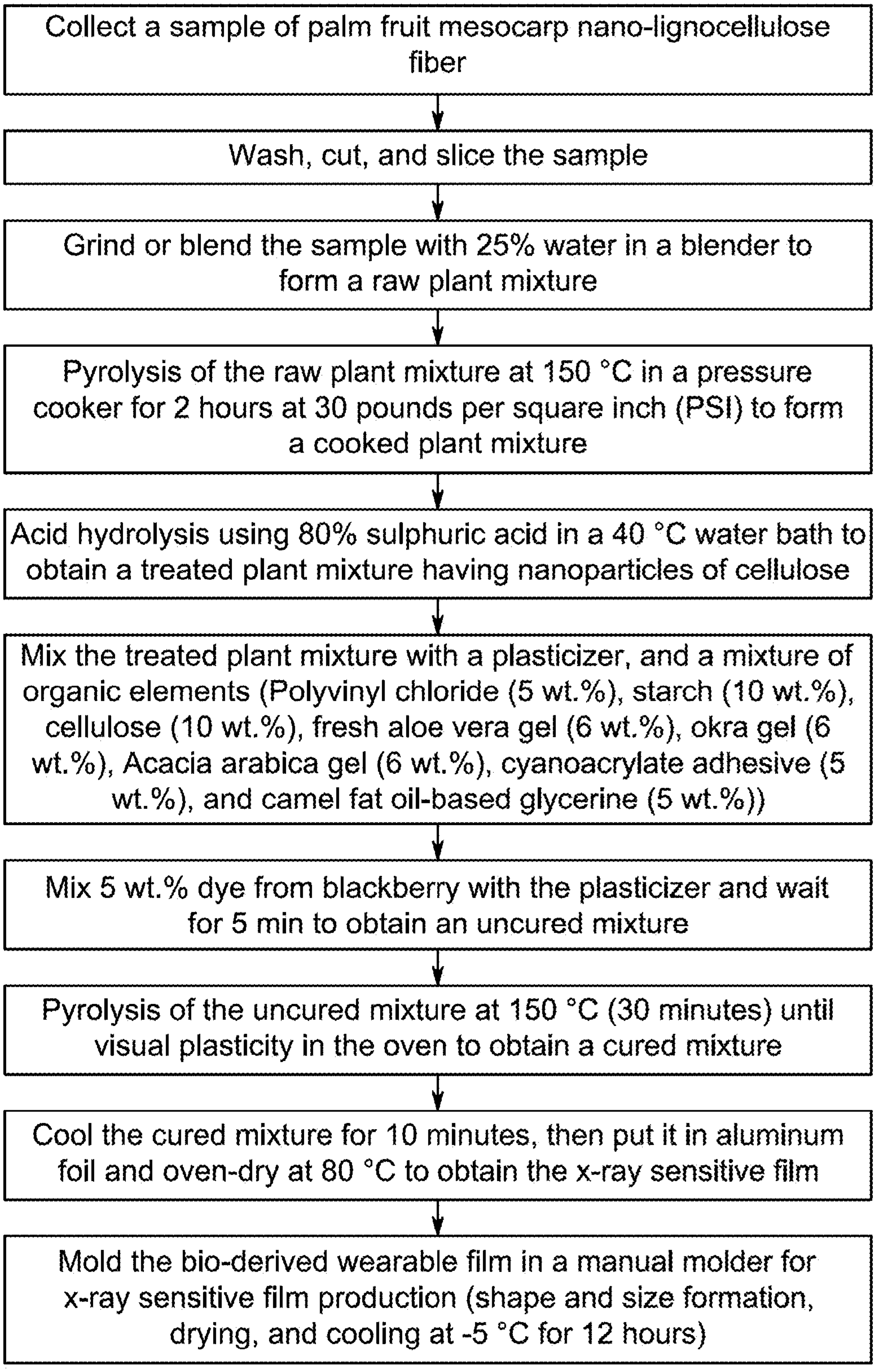
FIG. 1B is a flowchart describing a method of producing the X-ray-sensitive film, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The use of the terms "include," "includes", "including," "have," "has," or "having" should be generally understood as open-ended and non-limiting unless specifically stated otherwise. The present disclosure is intended to include all hydration states of a given compound or formula, unless otherwise noted or when heating a material.

X-Ray-Sensitive Film

Aspects of the present disclosure are directed to an X-ray-sensitive film derived from biological materials. Since a substantial portion or all of the X-ray-sensitive film of the present disclosure is derived from biological materials such as plant/plant parts, animals, bacteria, fungi, and other life forms, the X-ray-sensitive film may be referred to as a bio-derived X-ray-sensitive film (herein referred to as a film). The film of the present disclosure is environmentally friendly, easy to prepare, stable (does not degrade over time), and does not disintegrate due to heat or moisture.

Conventional X-ray-sensitive films includes 3 components—a base, an adhesive, and an emulsion, optionally coated with a protective layer (sometimes referred to as a coating or "super coat"). Typically, the base is made of a polyester, and is therefore not environmentally friendly. The base serves to impart structural support for the emulsion and also maintain its size and shape during processing, handling, and storage. Typically, the base has a thickness of about 0.1-0.3 mm. The emulsion in a conventional X-ray-sensitive film is a mixture of grains of a silver halide and gelatin. The emulsion is the portion of the film that is responsible for the sensitivity to X-rays. Disposed between the base and the emulsion is some adhesive to hold the emulsion to the base. Frequently, a protective layer is disposed on the emulsion to protect the emulsion from inadvertent damage.

In some embodiments, the X-ray-sensitive film includes an acid-hydrolyzed palm mesocarp, a starch, a cellulose, a synthetic polymer, a plant hydrogel, a cyanoacrylate adhesive, glycerin, and an X-ray-sensitive dye.

In general, the acid-hydrolyzed palm mesocarp can be formed from or derived from any suitable palm plant. A palm plant refers to a plant in the family Arecaceae. Currently, 181 genera with around 2,600 species of palm are recognized. Examples of genera of palms (and select palms in the genera) include, but are not limited to, *Archontophoenix*-Bangalow palms, *Areca*-*Betel* palms, Astrocaryum, Attalea, Bactris-Pupunha palms, Beccariophoenix, Bismarckia-Bismarck palm, Borassus-Palmyra palm, sugar palm, toddy palm, Butia, Calamus-Rattan palms, Ceroxylon, *Cocos* Coconut palms, Coccothrinax, Copernicia-Carnauba wax palms, Corypha-Gebang palm, Buri palm or Talipot palm, *Elaeis*-Oil palms, *Euterpe*-Cabbage heart palm, açaí palm, Hyphaene-Doum palms, Jubaea-Chilean wine palm, Coquito palm, Latania Latan palms, Licuala, Livistona-Cabbage palm, *Mauritia*-Moriche palm, *Metroxylon*-Sago palm, Nypa-Nipa palm, Parajubaea-Bolivian coconut palms, Phoenix-Date palms, *Pritchardia*, Raphia-Raffia palm, Rhapidophyllum, *Rhapis, Roystonea*-Royal palm, *Sabal*-Palmettos, Salacca-Salak palm, *Syagrus*-Queen palm, Thrinax, Trachycarpus-Windmill palm, Kumaon palm, Trithrinax, *Veitchia*-Manila palm, *Joannis* palm, and *Washingtonia*-Fan palm.

Palm mesocarp is the fleshy, edible part of the fruit that usually has a sweet and slightly turpentine flavor. The palm fruit is a sessile drupe that is typically spherical to ovoid or elongated in shape and is composed of an exocarp, a mesocarp (containing palm oil in the case of oil-producing palms) and an endocarp that surrounds a stone. In oil-producing palms, the valuable palm oil is trapped within the mesocarp. During palm oil production, the palm oil is separated from the mesocarp, which is typically discarded as bio-wase. In addition to palm oil, the palm mesocarp includes high amounts of cellulose and hemicellulose. Palm mesocarp can also contain lignin, however the amount of lignin depends strongly on the ripeness of the palm fruit. For example, ripe palm fruit typically contains high levels of lignin while unripe (green) palm fruit contains very little lignin. In some embodiments, the palm fruit mesocarp used in the present application is unripe palm fruit mesocarp. In some embodiments, the palm fruit mesocarp used in the present application is ripe palm fruit mesocarp. In some embodiments, the palm fruit mesocarp contain less than 30%, preferably 20%, preferably 10%, and preferably less than 5% of lignin. Although the palm fruit mesocarp containing lignin at ranges beyond the ranges suggested may be used as well, it is preferred to use palm fruit mesocarp with less amount of lignin. In some embodiments, the palm fruit mesocarp is subjected to delignifying treatment prior to being incorporated into the film or method of the present application. In some embodiments, the delignifying treatment involves treating the palm fruit mesocarp with an alkaline agent (i.e., a base). In an embodiment, acid hydrolysis using an aqueous acid like sulfuric acid may result in de-lignification, hemicellulose hydrolysis, and/or breakdown of cellulose to nanocellulose. In some embodiments, the acid-hydrolyzed palm mesocarp is substantially free of hemicellulose and lignin.

The acid-hydrolyzed palm fruit mesocarp contains cellulose. In some embodiments, the cellulose contained in the acid-hydrolyzed palm fruit mesocarp is nanocellulose. In some embodiments, acid-hydrolyzed palm fruit mesocarp (and therefore the film) includes nanocellulose in the form of particles, preferably particles in the form of fibrils having a diameter of 5 to 25 nm or about 10 nm, and a length of 50 to 100 nm or 70 to 80 nm.

In general, the nanocellulose particles can be any shape known to one of ordinary skill in the art. Examples of suitable shapes the nanocellulose particles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For nanocellulose particles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the nanocellulose particles are envisioned as having in any embodiments.

In some embodiments, the nanocellulose particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanocellulose particles having a different shape. As used herein, the term "non-uniform shape" refers to an average consistent shape that differs by more than 10% of the distribution of nanocellulose particles having a different shape. In one embodiment, the shape is uniform and at least 90% of the nanocellulose particles are rod-shaped, and less than 10% are polygonal and/or spherical. In another embodiment, the shape is non-uniform and less than 90% of the nanocellulose particles are rod-shaped, and greater than 10% are polygonal and/or spherical.

In some embodiments, the nanocellulose particles have a mean particle size of 10 to 35 nm, preferably 12.5 to 30 nm, preferably 15 to 25 nm, preferably 17.5 to 22.5 nm, preferably 19 to 21 nm, preferably 20 nm. In embodiments where the nanocellulose particles are spherical, the particle size may refer to a particle diameter. In embodiments where the nanocellulose particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the nanocellulose particles have an anisotropic shape such as nanorods, the particle size may refer to a length of the nanorod, a width of the nanorod, an average of the length and width of the nanorod. In some embodiments in which the nanocellulose particles have non-spherical shapes, the particle size refers to the diameter of a sphere having an equivalent volume as the particle. In some embodiments in which the nanocellulose particles have non-spherical shapes, the particle size refers to the diameter of a sphere having an equivalent diffusion coefficient as the particle.

In some embodiments, the nanocellulose particles of the present disclosure are monodisperse, having a coefficient of variation or relative standard deviation, expressed as a percentage and defined as the ratio of the particle size standard deviation (o) to the particle size mean (u) multiplied by 100 of less than 25%, preferably less than 10%, preferably less than 8%, preferably less than 6%, preferably less than 5%, preferably less than 4%, preferably less than 3%, preferably less than 2%. In some embodiments, the nanocellulose particles of the present disclosure are monodisperse having a particle size distribution ranging from 80% of the average particle size to 120% of the average particle size, preferably 90-110%, preferably 95-105% of the average particle size. In some embodiments, the nanocellulose particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

The film further includes a synthetic polymer. Examples of suitable synthetic polymers include polyethers such as polyethylene glycol, polypropylene glycol, polybutylene glycol, polydioxanone, poly(p-phenylene ether), polyoxymethylene, and polyphenyl ether; polysiloxanes such as polydimethylsiloxane, polyolefins such as plolyethylene, polystyrene, polyisoprene, and mixtures of these, polyacrylates such as polymethylmethacrylate, poly(benzyl methacrylate), poly(butyl methacrylate), poly(cyclohexyl methacrylate), poly(dodecylmethacrylate), poly(2-ethoxyethyl methacrylate), poly(ethyl methacrylate), poly(hexyl methacrylate), poly(2-hydroxyethyl methacrylate), poly(isobutyl methacrylate), poly(isopropyl methacrylate), poly(methyl methacrylate), poly(octadecyl methacrylate), poly(octyl methacrylate), poly(phenyl methacrylate), poly(propyl methacrylate), and poly(2-chloroethyl methacrylate); polyamides such as nylons such as nylon 4, nylon 6, nylon 11, nylon 46, and nylon 66, polyphthalamides such as poly (TPA/hexamethylenediamine) and poly(TPA/methylpentanediamine), polyurea, and poly(amino acids) such as poly (aspartic acid), poly(glutamic acid), polylysine, and polyalanine; polycarbonates such as polypropylene carbonate, allyl diglycol carbonate, and poly(bisphenol A carbonate), polysulfones, polyimides, poly(halogenated olefins) such as poly(tetrafluoroethylene) (PTFE), polyvinylidene difluoride (PVDF), and polyvinyl chloride (PVC); polyamide-imides, poly(maleic acid), polyacrylamide, polyacrylonitrile, poly(N-vinyl acetamide), polyurethanes, polystyrene, poly(2-vinylpyridine), poly(2-acrylamido-2-methylpropanesulfonic acid), polylactic acid (PLA), acrylonitrile butadiene styrene (ABS), polyacetal, polyvinyl alcohol (PVA), polyethylene terephthalate (PET), polybutyrate, polycaprolactone, polybutylene succinate, polyglocolide, and combinations of these. In a preferred embodiment, the synthetic polymer is PVC.

In some embodiments, the synthetic polymer is present in an amount of 2.5 to 7.5 wt. %, preferably 3 to 7 wt. %, preferably 3.5 to 6.5 wt. %, preferably 4 to 6 wt. %, preferably 4.5 to 5.5 wt. %, preferably 5 wt. %, based on a total weight of the film.

Starch is a polysaccharide (biopolymer). Typically, starch includes amylose and amylopectin. Amylose is a linear polymer of glucose molecules bound to each other through glycosidic bonds. Amylopectin is a branched polymer of glucose molecules. Typically, starch includes about 65 to 85 wt. % amylopectin and about 15 to 35 wt. % amylose, however, the amounts of amylose and amylopectin can depend on the starch source. Some starch sources contain little to no amylopectin while other starch sources contain almost exclusively amylopectin. Different forms of starch may be used, for example, starch derived from corn, tapioca, arrowroot, sago palm (*Metroxylon* sagu), wheat, rice, potato, and/or combinations thereof. In some embodiments, the starch is derived from the sago palm. In some embodiments, the starch is derived from corn. In some embodiments, the starch is a natural (unmodified starch). In some embodiments, the starch is a modified starch. Examples of modified starches include, but are not limited to dextrin, acid-treated starch, alkaline-treated starch, bleached starch, oxidized starch, enzyme-treated starch, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, acetylated oxidized starch. In some embodiment, the starch may be used in the form of powder. The starch is preferably functionalized with an alkyl or aryl alkyl xanthate, most preferably a secondary or tertiary alkyl xanthate such as isopropyl, isobutyl, isopentyl, neopentyl, neophyl or tertiary butyl xanthate.

In some embodiments, the starch is present in an amount of 10 to 20 wt. %, preferably 11 to 19 wt. %, preferably 12 to 18 wt. %, preferably 13 to 17 wt. %, preferably 14 to 16 wt. %, preferably 15 wt. %, based on a total weight of the film.

In some embodiments, the film includes a plant hydrogel. As used herein, "hydrogel" refers to a gel in which the swelling agent is water. Hydrogels are typically formed of a polymeric material that absorbs several times its own weight of water. The polymeric component of a hydrogel is typically referred to as "gelling agent". Hydrogel forming materials typically swell when absorbing water. Hydrogels can have a wide range of mechanical properties, for example, hydrogels can have a Young's modulus from about 10 Pa to about 3 MPa. Some hydrogels become slick. Hydrogels are typically classified based on the origin of the gelling agent. Hydrogels having synthetic polymer gelling agents can be referred to as "synthetic hydrogels". Examples of synthetic polymer gelling agents include, but are not limited to polyvinyl alcohol, polyethylene glycol, sodium polyacrylate, and the like. Hydrogels having naturally-derived polymeric gelling agents can be referred to as "natural hydrogels". Naturally-derived polymeric gelling agents typically include polypeptides, polynucleotides, polysaccharides, or combinations of these. When a polymeric gelling agent is derived from a plant, the resulting hydrogel can be referred to as a "plant hydrogel". Some gelling agents derived from plants are referred to as "gum" when not in the form of a hydrogel. In some embodiments, the hydrogels are plant hydrogels. Plant hydrogels help reduce moisture in the glove during wear. Examples of specific naturally-derived polymeric gelling agents include, but are not limited to starch, gelatin, chitin, hyaluronic acid, heparin, fibrin glycosaminoglycans lignin, chitosan, alginate, guar gum, and combinations of these. Some hydrogels, particularly naturally-derived hydrogels, can be identified based on the source of the hydrogel. This may be advantageous when the exact composition of the hydrogel is not known or is complex. In some embodiment, the plant hydrogel includes one or more selected from aloe vera gel, okra gel, and Acacia *arabica* gel. In some embodiments, the plant hydrogel includes both aloe vera gel and okra gel. In some embodiments, the weight ratio of the aloe vera gel to the okra gel is in the range of 1:5 to 5:1, preferably 1:4 to 4:1, preferably 1:3 to 3:1, preferably 2:1 to 1:2, preferably 1:1. In some embodiments, the plant hydrogel includes both okra gel and Acacia *arabica* gel. In some embodiments, the weight ratio of the okra gel to the Acacia *arabica* gel is preferably 1:5 to 5:1, preferably 1:4 to 4:1, preferably 1:3 to 3:1, preferably 2:1 to 1:2, preferably 1:1. In some embodiments, the plant hydrogel includes both aloe vera gel and Acacia *arabica* gel. In some embodiments, the weight ratio of the aloe vera gel to the Acacia *arabica* gel is preferably 1:5 to 5:1, preferably 1:4 to 4:1, preferably 1:3 to 3:1, preferably 2:1 to 1:2, preferably 1:1. In some embodiments, the plant hydrogel includes okra gel, aloe vera gel, and Acacia *arabica* gel. In some embodiments, the weight ratio of the aloe vera gel to the okra gel to the Acacia *arabica* gel is preferably 1:1:1.

In some embodiments, the plant hydrogel is present in an amount of 10 to 20 wt. %, preferably 12.5 to 17.5 wt. %, preferably 13 to 17 wt. %, preferably 14 to 16 wt. %, preferably 15 wt. %, based on a total weight of the film.

In some embodiments, the film includes glycerin. The glycerin may be obtained from animal and plant fat. In some embodiments, the glycerin may be obtained from triglyceride-rich vegetable fats, such as soy, coconut, and palm oils. In some embodiments, the glycerin is obtained from camel fat.

In some embodiments, the glycerin is present in an amount of 3.5 to 8.5 wt. %, preferably 4 to 8 wt. %, preferably 5 to 7 wt. %, preferably 6 wt. %, based on the total weight of the film. In some embodiments, the film further includes a biodegradable filler. Examples of biodegradable fillers include lignin, hemicellulose, and cellulose not derived from the acid-hydrolyzed palm fruit mesocarp. A biodegradable filler may be advantageous for imparting high strength, stiffness, and durability to the film. In some embodiments, the biodegradable filler is cellulose. The cellulose is not derived from the acid-hydrolyzed palm fruit mesocarp. In general, the cellulose used as the biodegradable filler can be any suitable cellulose. In some examples, the cellulose is microcrystalline cellulose. The cellulose can be cellulose, alkyl cellulose (also called alkylated cellulose) such as methylcellulose, ethylcellulose, propylcellulose, and the like, and hydroxyalkyl cellulose such as hydroxymethyl cellulose, hydroxyethyl cellulose, hydroxypropyl cellulose, and the like, amino cellulose (also called aminated cellulose) such as aminoethyl cellulose, diethylaminoethyl cellulose, and the like.

In some embodiments, the biodegradable filler is present is present in an amount of 10 to 20 wt. %, preferably 12.5 to 17.5 wt. %, preferably 13 to 17 wt. %, preferably 14 to 16 wt. %, preferably 15 wt. %, based on the total weight of the film.

In some embodiments, film has a total cellulose content of present in an amount of 32.5 to 45 wt. %, preferably 33 to 44.0 wt. %, preferably 33.5 to 43.5 wt. %, preferably 34.0 to 43.0 wt. %, preferably 34.5 to 42.5 wt. %, preferably 35 to 42.0 wt. %, preferably 35.5 to 41.5 wt. %, preferably 36.0 to 41.0 wt. %, preferably 36.5 to 40.5 wt. %, preferably 37.0 to 40.0 wt. %, preferably 37.5 to 39.5 wt. %, preferably 38.0 to 39.0 wt. %, preferably about 38.5 wt. %. That is, in some embodiments, cellulose is present in the film in an amount as described above.

The X-ray-sensitive film further includes an adhesive. In some embodiments, the adhesive is a cyanoacrylate adhesive. In general, the cyanoacrylate adhesive can include at least one monomer selected from 2-methoxyethyl 2-cyanoacrylate, 2-ethoxyethyl 2-cyanoacrylate, ethyl 2-cyanoacrylate, n-propyl 2-cyanoacrylate, iso-propyl 2-cyanoacrylate, n-butyl 2-cyanoacrylate, sec-butyl 2-cyanoacrylate, isobutyl 2-cyanoacrylate, tert-butyl 2-cyanoacrylate, n-pentyl 2-cyanoacrylate, neopentyl 2-cyanoacrylate, 1-ethylpropyl 2-cyanoacrylate, 1-methylbutyl 2-cyanoacrylate, n-hexyl 2-cyanoacrylate, n-heptyl 2-cyanoacrylate, n-octyl 2-cyanoacrylate, 2-octyl 2-cyanoacrylate, 2-ethylhexyl 2-cyanoacrylate, tetrahydrofurfuryl 2-cyanoacrylate, and mixtures thereof.

In some embodiments, the biodegradable filler is present is present in an amount of 2.5 to 7.5 wt. %, preferably 3 to 7 wt. %, preferably 4 to 6 wt. %, preferably 5 wt. %, based on the total weight of the X-ray-sensitive film.

In some embodiments, the starch is present in an amount of 10 to 20 wt. %, preferably 11 to 19 wt. %, preferably 12 to 18 wt. %, preferably 13 to 17 wt. %, preferably 14 to 16 wt. %, preferably 15 wt. %; the cellulose is present in an amount of 32.5 to 45 wt. %; the synthetic polymer is present in an amount of 2.5 to 7.5 wt. %, preferably 3 to 7 wt. %, preferably 3.5 to 6.5 wt. %, preferably 4 to 6 wt. %, preferably 4.5 to 5.5 wt. %, preferably 5 wt. %; 10 to 20 wt. %, preferably 12.5 to 17.5 wt. %, preferably 13 to 17 wt. %, preferably 14 to 16 wt. %, preferably 15 wt. %; the cyanoacrylate adhesive is present in an amount of 2.5 to 7.5 wt. %, preferably 3 to 7 wt. %, preferably 4 to 6 wt. %, preferably 5 wt. %, the glycerin is present in an amount of 2.5 to 7.5 wt. %, preferably 4 to 7 wt. %, preferably 4.5 to 6 wt. %, preferably 5 wt. %, each based on the total weight of the X-ray-sensitive film.

The film further includes an X-ray-sensitive dye that is added to the emulsion. In some embodiments, the X-ray-sensitive dye is Jamun dye. As used herein "jamun" refers to a fruit of a plant in the Syzgium genus. Jamun may also be known as Malabar plum, Java plum, black plum, jamun, jaman, jambul, or jambolana. Syzgium is a genus of flowering plants that belongs to the myrtle family, Myrtaceae. The genus comprises about 1200 species, however only some species produce edible fruits (jamun). Examples of fruit-producing species include Syzygium aqueum, Syzygium *australe*, Syzygium cordatum, Syzygium corynanthum, Syzygium crebrinerve, Syzgium cumini, Syzygium *curranii*, Syzygium forte, Syzygium grande, Syzygium jambos, Syzygium luehmannii, Syzygium malaccense, Syzygium oleosum, Syzygium *paniculatum*, Syzygium polycephaloides, Syzygium samarangense, and Syzygium suborbiculare. In some embodiments, the plant in the genus Syzgium is Syzgium cumini. Jamun dye is rich in anthocyanins, water-soluble, and has a color range from red to blue.

Method of Producing an X-Ray-Sensitive Film

Referring to FIG. 1A, a method 50 of producing a X-ray-sensitive film is described. The order in which method 50 is described is not intended to be construed as a limitation, and any number of the described method steps can be combined in any order to implement method 50. Additionally, individual steps may be removed or skipped from method 50 without departing from the spirit and scope of the present disclosure.

At step 52, the method 50 includes blending palm mesocarp and water to form a raw plant mixture. For this purpose, the palm mesocarp is collected from a suitable palm as described above.

Figure 2A:
FIG. 2A is an image depicting biomass from raw palm fruit waste, according to certain embodiments.

In general, the palm mesocarp may be as described above. An image of an exemplary palm mesocarp is shown in FIG. 2A. Generally, green fruits are preferred as they have less lignin content. In some embodiments, the method uses palm mesocarp containing less than 30%, preferably 20%, preferably 10%, and preferably less than 5% of lignin. In some embodiments, palm mesocarps containing lignin at ranges beyond the suggested ranges may also be used as well however, such palm mesocarps with higher percentages of lignin should be subjected to a delignification process before use. In some embodiments, the palm mesocarp is subjected to a delignification process before use in other steps of the method (e.g., the blending). To remove lignin, in some embodiments, the raw plant mixture may be subjected to alkaline hydrolysis with an alkaline solution. The alkaline solution can include a suitable base, such as a carbonate base, a hydroxide base, a bicarbonate base, or combinations of these. Preferably, the delignification process occurs prior to the heating. In some embodiments, the palm mesocarp is bleached. The bleaching may be performed with a suitable bleaching agent. Examples of suitable bleaching agents include, but are not limited to, hydrogen peroxide, bleach, chlorine, calcium hypochlorite, sodium hypochlorite, or a combination thereof. In a preferred embodiment, the bleaching agent is sodium hypochlorite.

Figure 2B:
FIG. 2B is an image depicting slices of dried biomass, according to certain embodiments.
Figure 2C:
FIG. 2C is an image of a ground palm fruit waste, according to certain embodiments.
Figure 2D:
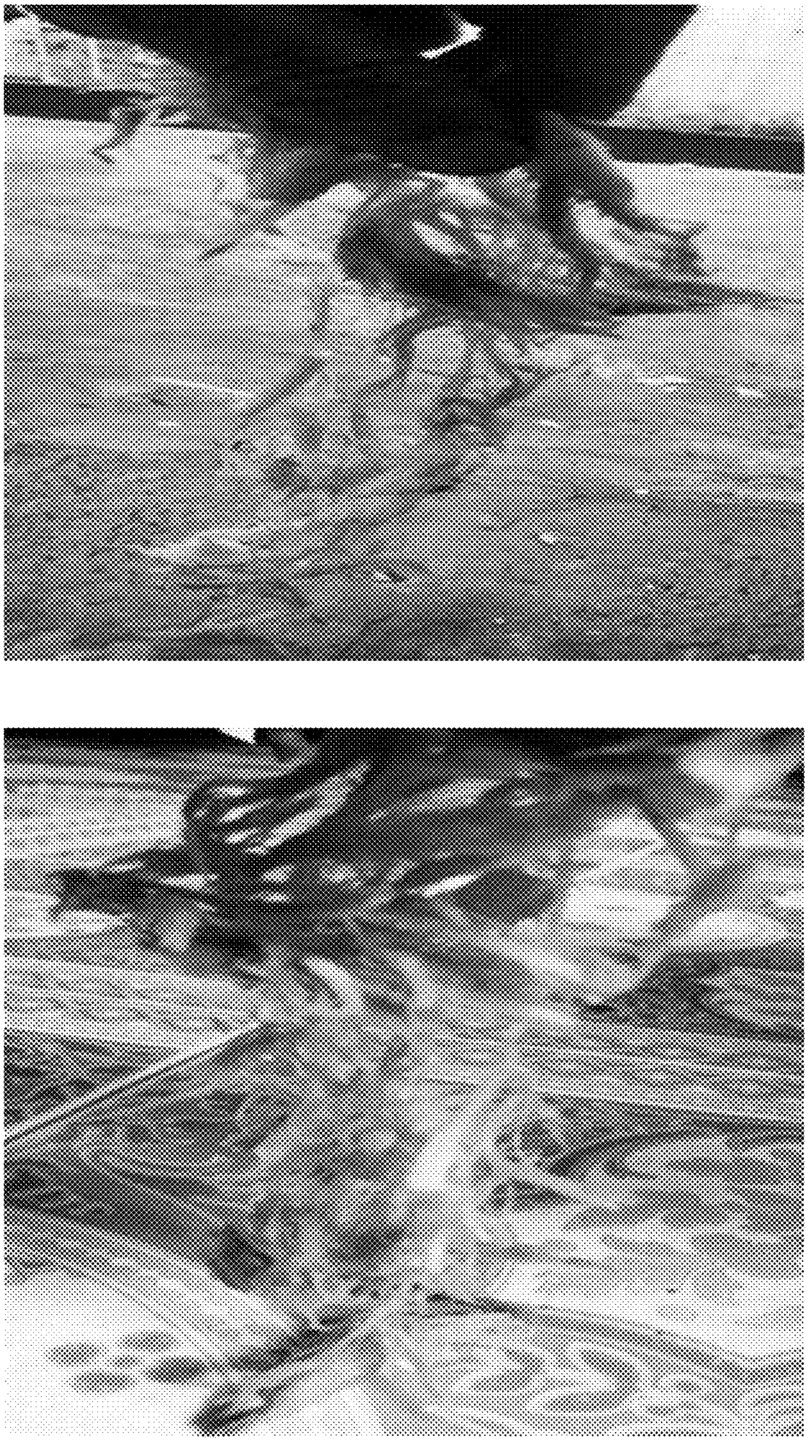
FIG. 2D is an image of the ground palm fruit waste blended in water, according to certain embodiments.
Figure 2E:
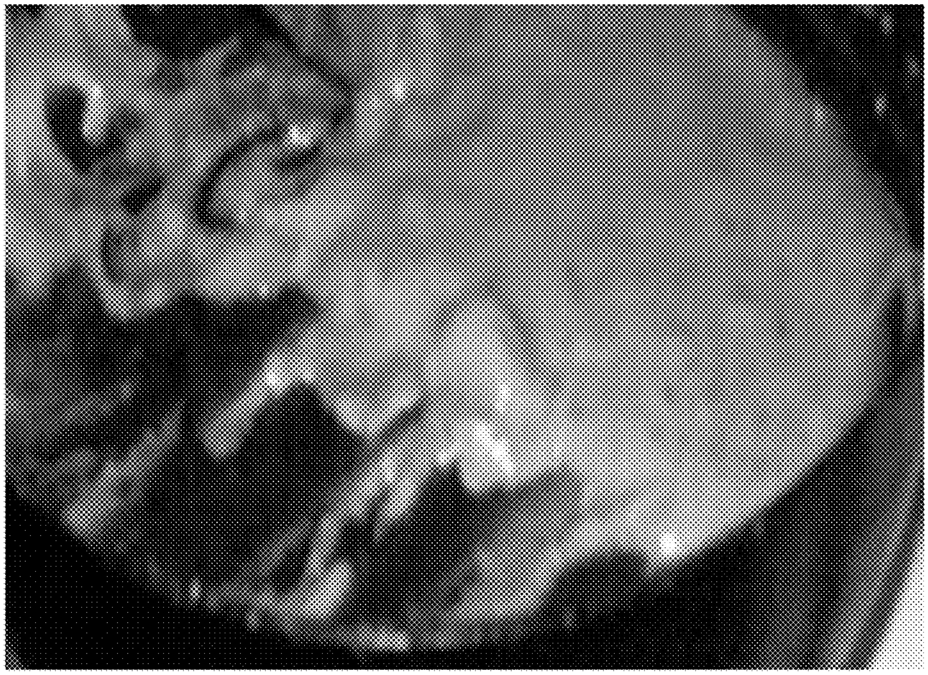
FIG. 2E is an image of a raw plant mixture obtained after blending the ground palm fruit waste in water, according to certain embodiments.

The palm mesocarp may be cut using a chopper or a shredder into small pieces/slices having a length of about 1 to 5 cm, preferably 2 to 3 cm (See FIG. 2B and FIG. 2C). The slices are further blended into a raw plant mixture (See FIG. 2D and FIG. 2E). The blending may be carried out in a mixer/grinder or any other blending device known in the art. In some embodiments, the palm mesocarp is blended into a raw plant mixture using added water. In some embodiments, the palm mesocarp is blended with 50% water, preferably about 45% water, preferably about 40% water, preferably about 35% water, preferably about 30% water, preferably about 25% of water by mass based on a total weight of raw plant mixture. The blending may be carried out in any suitable apparatus, such as a mixer/grinder or any other blending device known in the art.

At step 54, the method 50 includes heating the raw plant mixture to form a cooked plant mixture. The raw plant mixture predominantly includes celluloses and lignin. As described earlier, it is preferred to use palm mesocarp with a reduced amount of lignin. For this purpose, in some embodiments, the palm mesocarp may be subjected to alkaline hydrolysis with an alkaline solution, preferably sodium hypochlorite solution, or conventional bleaching agents prior to heating, to remove lignin. Suitable examples of bleaching agents include, but are not limited to, hydrogen peroxide, bleach, chlorine, calcium hypochlorite, sodium hypochlorite, or a combination thereof. In a preferred embodiment, the bleaching agent is sodium hypochlorite. However, if the palm mesocarp does not contain a significant amount of lignin, alkaline hydrolysis may be completely avoided. In a most preferred embodiment, the raw plant mixture is not subjected to any alkaline treatment and is devoid of an added base. In some embodiments, the raw plant mixture may be washed multiple times with hot water to remove lignin/hemicelluloses prior to heating.

In some embodiments, the raw plant mixture is heated to 125 to 175° C., preferably 130 to 170° C., preferably 135 to 165° C., preferably 140 to 160° C., preferably 145 to 155° C., preferably 150° C. In some embodiments, the raw plant mixture is headed at 15 to 45 pounds per square inch (PSI) gauge, preferably 20 to 40 PSI, preferably 25 to 35 PSI, preferably 30 PSI. In some embodiments, the raw plant mixture is heated for a period of 10 to 60 minutes, preferably 20 to 50 minutes, preferably 30 to 40 minutes, preferably 30 minutes. This process may be referred to a "pyrolysis". Generally, pyrolysis refers to a thermal decomposition process. The pyrolysis of the palm fruit mesocarp may in the partial or complete breakdown of cellulose into smaller particles of cellulose, i.e., microcellulose or nanocellulose.

Figure 2F:
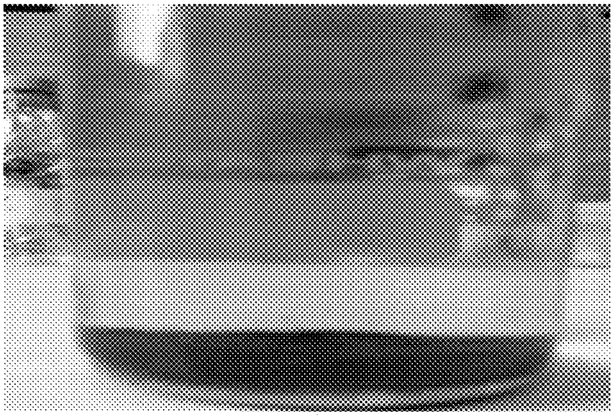
FIG. 2F is an image of a treated plant mixture obtained after acid hydrolysis, according to certain embodiments.
Figure 2G:
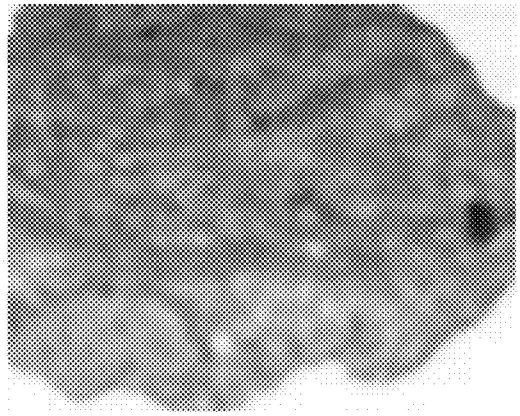
FIG. 2G is an image of an uncured mixture, according to certain embodiments.
Figure 2H:
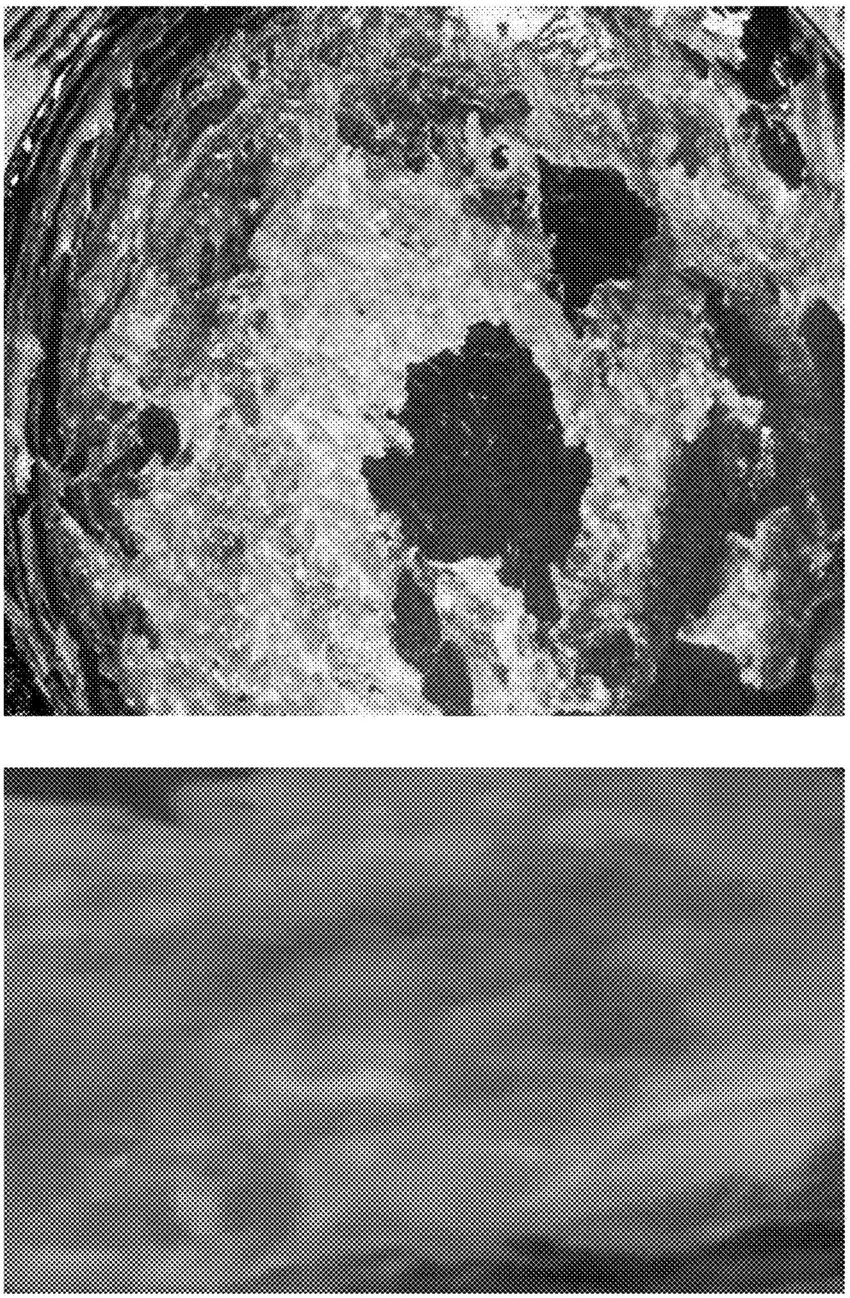
FIG. 2H is an image of a cured mixture after drying, according to certain embodiments.

At step 56, method 50 includes acid treating the cooked plant mixture with an aqueous acid to form a treated plant mixture. In general, the aqueous acid can be an inorganic (mineral) acid, an organic acid, or a mixture thereof. Examples of inorganic acids include but are not limited to nitric acid, sulfuric acid, phosphoric acid, perchloric acid, hydrobromic acid, hydrochloric acid, hydroiodic acid, hydrofluoric acid, boric acid, and the like. Examples of organic acids include but are not limited to formic acid, acetic acid, propionic acid, butyric acid, valeic acid, caproic acid, oxalic acid, lactic acid, malic acid, citric acid, carbonic acid, benzoic acid, phenol, uric acid, carboxylic acids, sulfonic acid, and the like. In some embodiments, the aqueous acid is sulfuric acid. In some embodiments, the sulfuric acid is 80% sulfuric acid. In some embodiments, the acid treatment is performed at 30 to 60° C., preferably 40 to 50° C., preferably 40° C. This process may be referred to as acid hydrolysis. Acid hydrolysis may result in the partial or complete conversion of macro or microparticles of cellulose (microcellulose) to nanoparticles (nanocellulose). (See FIG. 2F). Acid hydrolysis may also result in the delignification of palm mesocarp At step 58, the method 50 includes mixing the treated plant mixture with a starch, a cellulose, a synthetic polymer, a plant hydrogel, a cyanoacrylate adhesive, glycerin, and an X-ray-sensitive dye to form an uncured mixture (See FIG. 2G and FIG. 2H). In general, the starch may be any suitable starch as described above. In a preferred embodiment, the starch may be used in the form of powder. In general, the synthetic polymer may be any suitable synthetic polymer as described above. In a preferred embodiment, the synthetic polymer is PVC. The glycerin may be obtained from animal and plant fat as described above. In some embodiments, the glycerin may be obtained from triglyceride-rich vegetable fats, such as soy, coconut, and palm oils. In a preferred embodiment, the glycerin is preferably obtained from waste-fish oil. The plant hydrogel may be a plant hydrogel as describe above.

In some embodiments, the starch is present in an amount of 10 to 20 wt. %, preferably 11 to 19 wt. %, preferably 12 to 18 wt. %, preferably 13 to 17 wt. %, preferably 14 to 16 wt. %, preferably 15 wt. %; the cellulose is present in an amount of 32.5 to 45 wt. %; the synthetic polymer is present in an amount of 2.5 to 7.5 wt. %, preferably 3 to 7 wt. %, preferably 3.5 to 6.5 wt. %, preferably 4 to 6 wt. %, preferably 4.5 to 5.5 wt. %, preferably 5 wt. %; 10 to 20 wt. %, preferably 12.5 to 17.5 wt. %, preferably 13 to 17 wt. %, preferably 14 to 16 wt. %, preferably 15 wt. %; the cyanoacrylate adhesive is present in an amount of 2.5 to 7.5 wt. %, preferably 3 to 7 wt. %, preferably 4 to 6 wt. %, preferably 5 wt. %, the glycerin is present in an amount of 2.5 to 7.5 wt. %, preferably 4 to 7 wt. %, preferably 4.5 to 6 wt. %, preferably 5 wt. %, each based on the total weight of the uncured mixture. In some embodiments, the treated plant mixture is present in an amount of 31.5 to 76.5 wt. %, preferably 32.5 to 72.5 wt. %, preferably 35.0 to 70.0 wt. %, preferably 37.5 to 67.5 wt. %, preferably 40.0 to 65.0 wt. %, preferably 42.5 to 62.5 wt. %, preferably 45 to 60 wt. %, based on the total weight of the uncured mixture.

Figure 2I:
FIGS. 2I-FIG. 2J are images of an X-ray-sensitive film obtained after drying at various stages, according to certain embodiments.
Figure 2J:
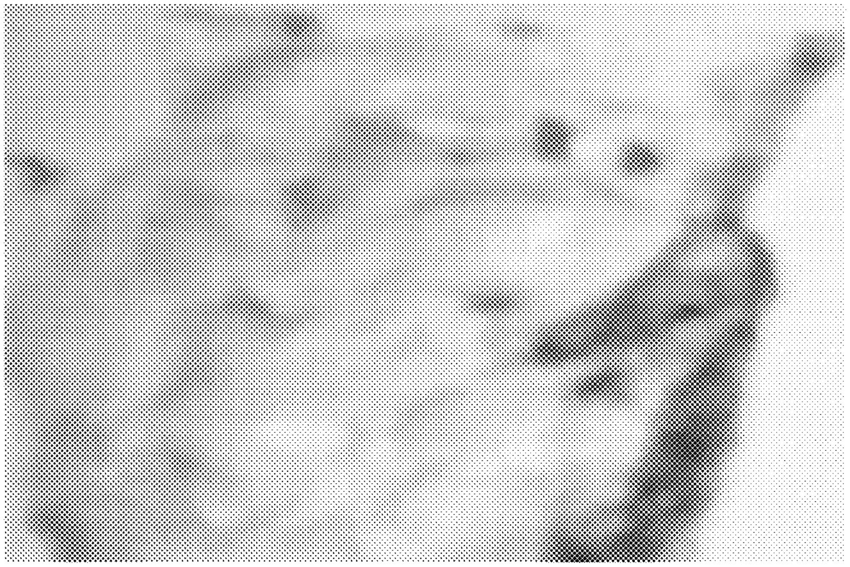

At step 60, the method 50 includes heating the uncured mixture to 125 to 175° C., preferably 130 to 170° C., preferably 135 to 165° C., preferably 140 to 160° C., and preferably 150° C. In some embodiments, the uncured mixture is heated for 10 to 60 minutes, preferably 20 to 50 minutes, preferably 30 to 40 minutes, preferably 30 minutes. (See FIG. 2I and FIG. 2J). Generally, it is preferred to carry out the heating process until a visual plasticity is observed. During this process, the polymers and the added biomaterials in the uncured mixture react to make the film stronger and elastic. The heating may be carried out in an oven/mantle. In some embodiments, the pH of the uncured mixture is adjusted using a base to a range of pH of 7.0 to 11.0.

In a preferred embodiment of the invention, more of the steps of curing and drying is carried out concurrently with, immediately prior or subsequent to to casting the uncured or partially cured mixture to form the film. Casting, similar to spin coating, but is typically carried out on a stationary substrate. In the present disclosure the substrate is preferably moving and is heated. The uncured or partially cured mixture cast on the substrate is heated and may undergo accelerated curing and/or accelerated drying by heat transfer from the substrate. In a preferred embodiment, an uncured or partially cured mixture is cast onto a substrate that is moving or radially or linearly away from a discharge point of the mixture. In this fashion, the mixture is in tension as it contacts the substrate moving away from the discharge point of the mixture. In this manner, a continuous supply of the mixture is discharged from a stationary discharge point onto a moving substrate. The thickness of the film can be managed by controlling the speed of the movement of the substrate and/or the temperature of the mixture as it is discharged onto the substrate. The liquid film formed from the discharge point is continuous from the discharge point to a contact point of the substrate. The thickness of the film can be varied by increasing or decreasing the speed of the substrate's movement. An advantage achieved in this manner of forming the film includes permitting portions of the insoluble components in the mixture, such as cellulose particles, to align during the casting.

Figure 2K:
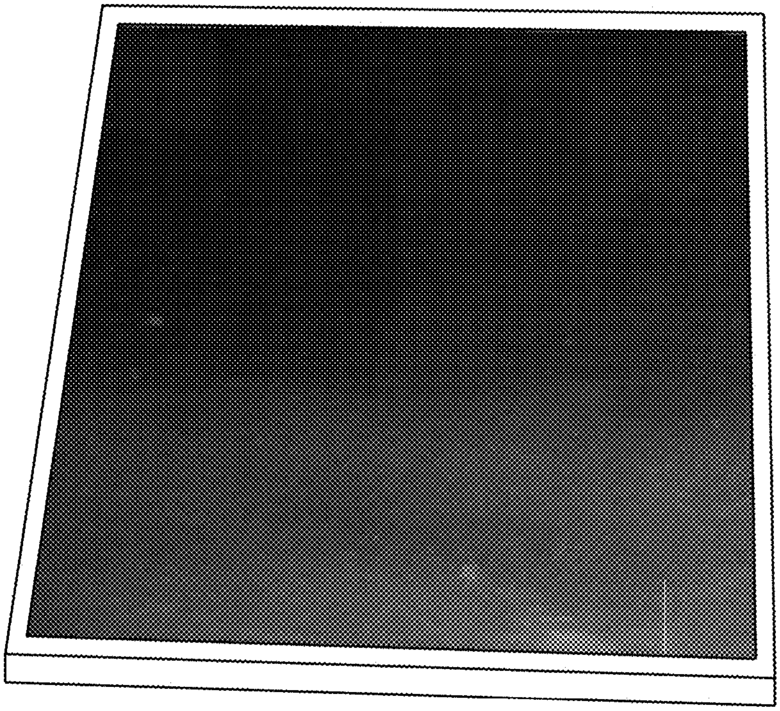
FIG. 2K and FIG. 2M are images of the X-ray-sensitive film, according to certain embodiments.
Figure 2L:
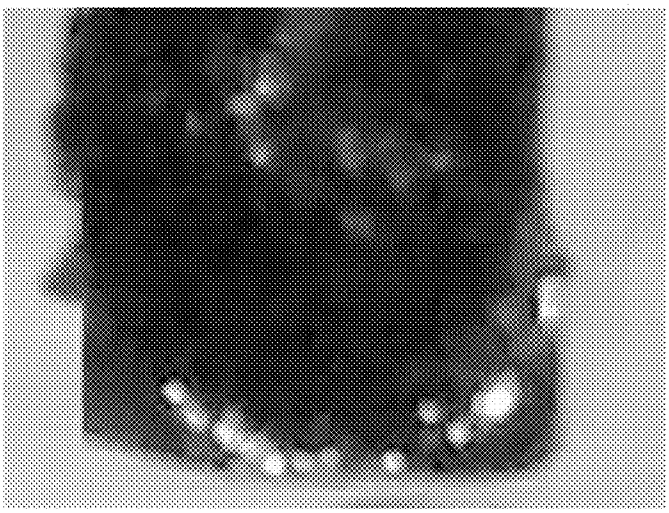
FIG. 2L and FIG. 2N are images of a synthetic X-ray-sensitive film, according to certain embodiments.
Figure 2M:
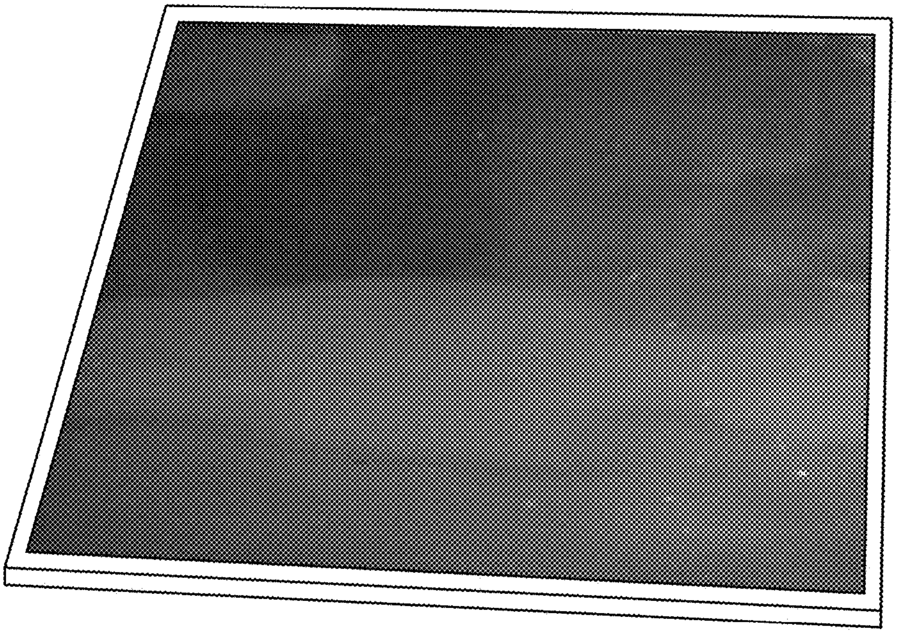
Figure 2N:

This is turn forms a film having improved properties such as penetration resistance and stretch resistance. At step 62, method 50 includes drying the cured mixture at 60 to 100° C., preferably 70 to 90° C., preferably 80° C. for about 10 to 30 minutes, preferably 10 minutes, to form the X-ray-sensitive film (FIG. 2K and FIG. 2M). In some embodiments, the drying process may optionally be carried out on an aluminum foil to speed up the process. The pictorial images of a synthetic X-ray-sensitive film are depicted in FIG. 2L and FIG. 2N for the sake of comparison.

In some embodiments, the X-ray-sensitive film has a tensile modulus of 0.75 to 2.5 GPa, preferably 1.0 to 2.0 GPa, preferably 1.25 to 1.75 GPa, preferably 1.4 to 1.6 GPa, preferably about 1.5 GPa. In some embodiments, the X-ray-sensitive film has a tensile strength of 75 to 125 MPa/kg·m$^3$, preferably 85 to 115 MPa/kg·m$^3$, preferably 90 to 110 MPa/kg·m$^3$, preferably 95 to 105 MPa/kg·m$^3$, preferably about 100 MPa/kg·m$^3$. In some embodiments, the X-ray-sensitive film has a water absorption of 0.00 to 0.16%, preferably 0.001 to 0.1%. Preferably, the water adsorption is measured according to ASTM D570. In some embodiments, the X-ray-sensitive film has a carbonate content of 100 to 200 ppm, preferably 110 to 190 ppm, preferably 120 to 180 ppm, preferably 125 to 175 ppm, preferably 130 to 160 ppm, preferably 135 to 150 ppm, preferably 140 to 145 ppm. In some embodiments, the X-ray-sensitive film shows no cracks when tested according to ASTM D5419.

Figure 1C:
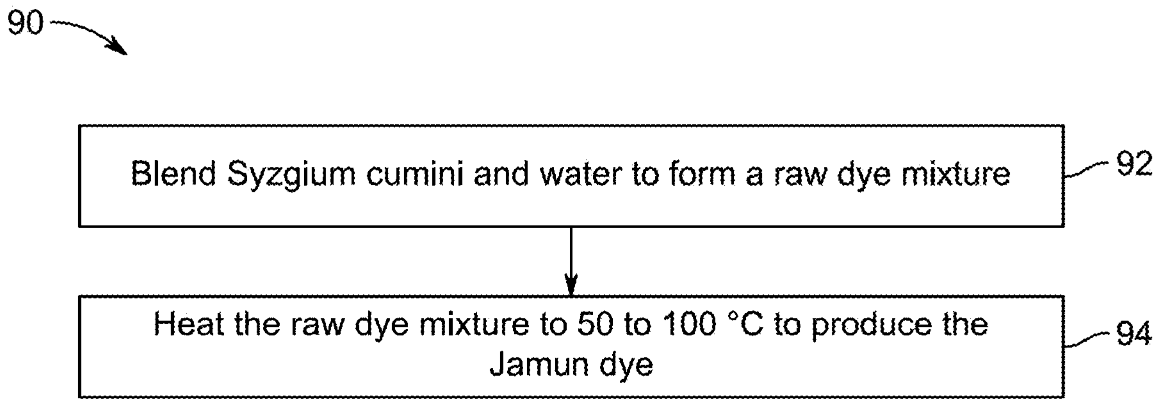
FIG. 1C is a flowchart describing a method of obtaining a Jamun dye from Syzgium cumini, according to certain embodiments.

Referring to FIG. 1C, a method of making a Jamun dye is described. The order in which the method 90 is described is not intended to be construed as a limitation, and any number of the described method steps can be combined in any order to implement the method 90. Additionally, individual steps may be removed or skipped from the method 90 without departing from the spirit and scope of the present disclosure.

At step 92, method 90 includes blending a fruit of a plant in the Syzgium genus and water to form a raw dye mixture. In general, the fruit may be derived from any suitable plant in the Syzgium genus, as described above. In some embodiments, the plant in the Syzgium genus is Syzgium cumini. In some embodiments, the weight-to-volume ratio of the fruit of a plant in the Syzgium genus to water is in the range of 1:5 to 5:1, preferably 1:4 to 4:1, preferably 3.5:1 to 1:3.5, and more preferably 3:1. After adding the fruit of a plant in the Syzgium genus to water, the fruit of a plant in the Syzgium genus may be blended by any of the blending techniques known in the art to obtain the raw dye mixture.

At step 94, the method 90 includes heating the raw dye mixture to 50 to 100° C., preferably 60 to 90° C., preferably 70 to 80° C., preferably 70° C. In some embodiments, the raw dye mixture may be heated for 10 to 60 minutes, preferably 20 to 50 minutes, preferably 30 to 40 minutes, and more preferably 30 minutes. In some embodiments, the dye may be obtained by any other conventional methods known in the art.

EXAMPLES

The following examples demonstrate an X-ray-sensitive film. The examples are provided solely for illustration and are not to be construed as limitations of the present disclosure, as many variations thereof are possible without departing from the spirit and scope of the present disclosure.

Example 1: Preparation of Blackberry Dye

Figure 3:
FIG. 3 is an image of waste blackberry according to certain embodiments.

1 Kg waste blackberry (Indian Blackberry: Syzgium cumini), as shown in FIG. 3, was blended and mixed with water in a 3:1 ratio (blackberry:water) and then heated at 70° C. in the oven for 30 minutes to obtain a stain for dying.

Example 2: Preparation of X-Ray Sensitive Film

Palm fruit mesocarp was washed with water and sliced. The sliced palm fruit mesocarp was blended with 25% water and heated at 150° C. in a pressure cooker for 2 hours at 30 psi. The resulting pyrolyzed palm fruit mesocarp was treated with 80% sulfuric acid in water at 45° C. to convert the cellulose to nanocellulose. The acid-treated palm fruit mesocarp was mixed with Polyvinyl chloride (5%), starch (15%), cellulose (15%), fresh aloe vera gel (5%), okra gel (5%) acacia *arabica* gel (5%), cyanoacrylate adhesive 5%, and organic-based glycerin [waste camel fat (oil) based glycerin] (5%). The blackberry organic dye (5%) was added and the resulting mixture allowed to stand for 5 minutes. The aged mixture was heated in an oven at 150° C. for 30 min until visual plasticity was observed. The material was t hen cooled for 10 min before a hot molding process and put in the aluminum foil and oven dried at 80° C. The dried material was then subjected to a second molding process in manual molder or former for nanobiomaterial production (shape and size formation, drying and cooling at −50° C. for 12 hours).

Example 3: pH and Cellulose Determination

The pH and cellulose content of the X-ray-sensitive film prepared by the method of the present disclosure were determined, and their values were compared to those of synthetic films available in the market. The pH was determined using a Horiba Scientific pH meter, Japan. The quantitative determination of cellulose was carried out using methods known in the art. The results of this study are depicted in Table 1.

TABLE 1 pH and Cellulose determination

| Materials | pH determination | Cellulose determination |
|---|---|---|
| X-ray-sensitive film | 8.1 ± 0.01 | 38.7% ± 0.3 |
| Synthetic film | Alkaline ≥ 8 | It is zero if from gas or oil; if from cellulose sample, it is 20-40%. |

Mean ± SE (standard Error, n = 3)

Example 4: Nanoparticle Measurement

The particle size of the nanocellulose was measured by Scanning Electron Microscopy (SEM), and the results of this study are depicted in Table 2.

TABLE 2

| Particle size | |
|---|---|
| Materials | Nanocellulose particle size (nm) |
| X-ray-sensitive film | 20 nm |
| Standard size of nanocellulose particles | 1-100 nm |

Example 5: Absorption Test (as ASTM D570)

The X-ray-sensitive film prepared was further evaluated for its ability to absorb moisture. The tests to determine water absorption were carried out in accordance with ASTM D570. The purpose of ASTM D570 is to determine the rate of water absorption by immersing the specimen (X-ray-sensitive film) in water for a specific period of time. To perform the test, the X-ray-sensitive film was dried in an oven for a specified time and temperature and then placed into the desiccator to cool. Immediately upon cooling, the X-ray-sensitive film was weighed. The X-ray-sensitive film was then submerged in water at agreed-upon conditions, often 23° C. for 48 h. The X-ray-sensitive film was removed, patted dry with a lint-free cloth, and weighed. Water absorption was calculated by determining the percentage increase in weight of the sample following the experiment to characterize this attribute. The results of this study are depicted in Table 3. It can be observed that the water absorption for the X-ray-sensitive film prepared by the present disclosure is very low compared to synthetic films-suggesting their water-resistant property.

TABLE 3

| Water absorption by ASTM D570 | | |
|---|---|---|
| Materials | Water absorption | Water absorption ASTM D570 |
| X-ray-sensitive film | 0.001% | 0-0.16% |
| Synthetic film | 0-0.16% | |

Example 6: Burning Test

The X-ray-sensitive film was burnt by using a gas burner. Odor, color of flame, speed of burning, and spark were observed by visual observation and compared with the synthetic films by ASTM D3801. The results of this study are depicted in Table 4.

TABLE 4

| Burning test according to the ASTM D3801 | | | | |
|---|---|---|---|---|
| Materials | Odor | Color of flame | Speed of burning | Spark or not |
| X-ray-sensitive film | Low odor | Yellow-orange | Slow | Spark |
| Synthetic film | Low odor | Yellow-orange | Slow | Spark |

Example 7: Color Test

Spray coating dye was used as the mode of application. It was attached properly to the X-ray-sensitive film and dried after 1 h. The color dye drying time was 1.4 hours, which is less than the maximum of 2 hours, according to ASTM B 117. The results of this study are depicted in Table 5.

TABLE 5

| Organic dye was used as the mode of application by ASTM B 117 | | |
|---|---|---|
| Materials | Color test (Drying time) | ASTM B117 |
| X-ray-sensitive film | 1.4 h | Maximum 2 hours |
| Synthetic film | 2 h (max). | Maximum 2 hours |

Example 8: Determination of Size and Shape Characteristics by ASTM a 500

The X-ray-sensitive film was hit by a hammer continuously for 2 minutes and pulled on for 5 minutes. There was no change in its shape and size as per ASTM A500. The results of this study are depicted in Table 6.

TABLE 6

| Size and shape characteristics as per ASTM A500 | | |
|---|---|---|
| Materials | Size and shape | ASTM A500 |
| X-ray-sensitive film | No swell or shrink | Resistant characters |
| Synthetic film | No swell or shrink | Resistant characters |

Example 9: Energy Test

The energy was tested for the X-ray-sensitive film using the following equation: $E=\frac{1}{2}mv^2$ in accordance with ASTM E1886. The results of this study are depicted in Table 7. The results were found to be in accordance with the ASTM E1886.

TABLE 7

| Energy test of the nanobiofilm (ASTM E1886) | | |
|---|---|---|
| Materials | Energy | ASTM E1886 |
| X-ray-sensitive film | 1.5 Joule | 1.0-25 Joule |
| Synthetic film | 1.0-25 Joule | |

Example 10: Firmness Test

The X-ray-sensitive film was hit by a hammer of 1 kg. The hit was completed in 5 minutes. No bore or crak were observed as per ASTM D2925 or ASTM D5419, respectively. The results of this study are depicted in Table 8.

TABLE 8

| Firmness test represented by bore and crack test. | | |
|---|---|---|
| Materials | Bore test ASTM D2925 | Crack test by ASTM D5419 |
| X-ray-sensitive film | No bore symptom | No crack symptom |
| Synthetic film | No bore symptom | No Crack symptom |

Example 11: Tensile Test

The tensile test was done by a Universal Test Machine for bioplastics as ASTM D5083. For this purpose, the film was placed in the grips of a Universal Test Machine at a specified grip separation and pulled until failure. For ASTM D5083, the test speed was measured by the material specification. The default test speed was 5 mm/min (0.2 in/min), but modulus determination was made at 1.5 mm/min (0.057 in/min). A strain gauge was used to determine the elongation and tensile modulus. The Max Load Capacity was 50 kN/m$^2$, depending upon the reinforcement and type. The results of this study are depicted in Table 9.

TABLE 9

| Determination of tensile test by using ASTM by ASTM D5083 | | |
|---|---|---|
| Materials | Tensile strength (MPa/kg · m$^3$) | Tensile Modulus (GPa) |
| X-ray-sensitive film | 100.0 | 1.5 |
| Synthetic film | 70-230 (ASTM) | 1.0-3.0 (ASTM D5083) |

Example 12: Chemical Element Test

The chemical element like $K^+$, $CO_3^{-2}$, $Cl^-$, $Na^+$ were tested using different meters. $K^+$ and $Na^+$were tested by LAQUA twin $K^+$ meter and LAQUA twin $Na^+$ meter (Horiba, Japan). $CO_3^{-2}$, and $Cl^-$ were tested by Photometer PF-3 version A (Macherey-Nagel, Germany). Positive results are obtained for all the chemical elements for the film prepared by the method of present disclosure in comparison to the synthetic film as per European Standard EN166. The results of this study are depicted in Table 10.

TABLE 10

| Chemical element test | | | | |
|---|---|---|---|---|
| Materials | $K^+$ (PPM) | $Na^+$ (PPM) | $Cl^-$ (PPM) | $CO_3^{-2}$ (PPM) |
| X-ray-sensitive film | 10.9 ± 0.4 | 5.5 ± 0.3 | 0.59 ± 0.02 | 145 ± 1.0 |
| Synthetic glove by EN (European Standard EN166) | 10 | 5 | 2 | 5-440 |

Numerous modifications and variations of the present disclosure are possible in light of the above teachings. Therefore, it is to be understood that within the scope of the appended claims. the invention may be practiced other than as specifically described herein.

The invention claimed is:

1. A method of forming a nanocellulose X-ray film, the method comprising blending palm mesocarp and water to form a raw plant mixture;

heating the raw plant mixture to form a cooked plant mixture;

acid treating the cooked plant mixture with an aqueous inorganic acid at 30 to 60° C. to form a treated plant mixture comprising nanocellulose having a mean particle size of 10 to 35 nm;

mixing the treated plant mixture with a starch, a cellulose, a synthetic polymer, a plant hydrogel, a cyanoacrylate adhesive, glycerin, and an X-ray-sensitive dye to form an uncured mixture;

heating the uncured mixture to 125 to 175° C. to form a cured mixture; and drying the cured mixture at 60 to 100° C. to form the X film.

2. The method of claim 1, wherein the method further comprises adjusting a pH of the uncured mixture to a pH of 7.0 to 11.0;

the X-ray-sensitive dye is a Jamun dye obtained by:

blending Syzgium cumini and water to form a raw dye mixture; and heating the raw dye mixture to 50 to 100° C. to produce the Jamun dye;

the palm mesocarp is unripe palm mesocarp;

the aqueous inorganic acid is 80% sulfuric acid;

the synthetic polymer is polyvinyl chloride;

the plant hydrogel comprises aloe vera gel, okra gel, and acacia *arabica* gel;

the X-ray film comprises nanocellulose having a mean particle size of 20 nm;

the X-ray film comprises 32.5 to 45 wt % cellulose based on a total weight of the X-ray film, has a tensile modulus of 0.75 to 2.5 GPa, and has a tensile strength of 75 to 125 MPa/kg·m$^3$; and the starch is present in an amount of 10 to 20 wt %;

the synthetic polymer is present in an amount of 2.5 to 7.5 wt %;

the plant hydrogel is present in an amount of 10 to 20 wt %;

the cyanoacrylate adhesive is present in an amount of 2.5 to 7.5 wt %;

the glycerin is present in an amount of 2.5 to 7.5 wt %; and the treated plant mixture is present in an amount of 17.5 to 62.5 wt %, each based on a total weight of X-ray film.

3. The method of claim 1, wherein the raw plant mixture is heated to 125 to 175° C. at 15 to 45 PSI gauge.

4. The method of claim 1, wherein the raw plant mixture is devoid of an added base.

5. The method of claim 1, the aqueous inorganic acid is 80% sulfuric acid.

6. The method of claim 1, wherein the starch is present in an amount of 10 to 20 wt %;

the synthetic polymer is present in an amount of 2.5 to 7.5 wt %;

the plant hydrogel is present in an amount of 10 to 20 wt %;

the cyanoacrylate adhesive is present in an amount of 2.5 to 7.5 wt %;

the glycerin is present in an amount of 2.5 to 7.5 wt %; and the treated plant mixture is present in an amount of 17.5 to 62.5 wt %, each based on a total weight of X-ray film.

7. The method of claim 1, wherein the synthetic polymer is polyvinyl chloride.

8. The method of claim 1, wherein the plant hydrogel comprises aloe vera gel, okra gel, and acacia *arabica* gel.

9. The method of claim 1, further comprising adjusting a pH of the uncured mixture to a pH of 7.0 to 11.0.

10. The method of claim 1, wherein the X-ray-sensitive dye is a Jamun dye and the method further comprises:

blending Syzgium cumini and water to form a raw dye mixture; and heating the raw dye mixture to 50 to 100° C. to produce the Jamun dye.

11. The method of claim 1, wherein the X-ray film comprises nanocellulose having a mean particle size of 20 nm.

12. The method of claim 1, wherein the X-ray film comprises 32.5 to 45 wt % cellulose based on a total weight of X-ray film, has a tensile modulus of 0.75 to 2.5 GPa, and has a tensile strength of 75 to 125 MPa/kg·m$^3$.

13. A nanocelluose X-ray film, comprising an acid-hydrolyzed palm mesocarp;

a starch;

a cellulose;

a nanocellulose having a mean particle size of 10 to 35 nm;

a synthetic polymer;

a plant hydrogel;

a cyanoacrylate adhesive;

glycerin; and an X-ray-sensitive dye.

14. The X-ray film of claim 13, wherein the starch is present in an amount of 10 to 20 wt %;

the synthetic polymer is present in an amount of 2.5 to 7.5 wt %;

the plant hydrogel is present in an amount of 10 to 20 wt %;

the cyanoacrylate adhesive is present in an amount of 2.5 to 7.5 wt %; and the glycerin is present in an amount of 2.5 to 7.5 wt %, each based on a total weight of X-ray film.

15. The X-ray film of claim 13, wherein the X-ray film comprises nanocellulose having a mean particle size of 20 nm 10 to 35 nm.

16. The X-ray film of claim 13, wherein the X-ray film comprises 32.5 to 45 wt % cellulose based on a total weight of the X-ray film, has a tensile modulus of 0.75 to 2.5 GPa, and has a tensile strength of 75 to 125 MPa/kg·m$^3$.

17. The X-ray film of claim 13, wherein the synthetic polymer is polyvinyl chloride.

18. The X-ray film of claim 13, wherein the plant hydrogel comprises aloe vera gel, okra gel, and acacia *arabica* gel.

19. The X-ray film of claim 13, wherein the X-ray-sensitive dye is a Jamun dye derived from Syzgium cumini.

20. The X-ray film of claim 13, wherein the X-ray film has a water absorption of 0.00 to 0.16% measured according to ASTM D570;

has a carbonate content of 100 to 200 ppm; and shows no cracks when tested according to ASTM D5419.

* * * * *